Patented Oct. 14, 1924.

1,511,520

UNITED STATES PATENT OFFICE

WILLIAM H. REES, OF BERKELEY, CALIFORNIA.

CATALYST AND PROCESS OF MAKING THE SAME.

No Drawing. Application filed June 15, 1920. Serial No. 389,179.

*To all whom it may concern:*

Be it known that I, WILLIAM H. REES, a citizen of the United States, and a resident of Berkeley, county of Alameda, and State of California, have invented a new and useful Catalyst and Process of Making the Same, of which the following is a specification.

My invention relates to catalyzers and the objects of the invention include the provision of a catalyst comprising a potential catalyzer such as nickel formate, in a finely divided condition intimately incorporated with a carrier of buoyant, pulverulent, inert, unfilterable material, such as infusorial earth. Another object of the invention is the provision of an improved method of making the catalyst.

My invention possesses other objects and features of advantage some of which, with the foregoing, will be set forth in the following description of my invention. It is to be understood that I do not limit myself to the showing made by the said description, as I may adopt variant forms of my invention within the scope of the claims.

It is well known that certain metals and their compounds, known as catalysts, have the property of facilitating the hydrogenation or reduction of oils. Of these metals, nickel, although less active than some others, is most used on account of its relative cheapness. Many salts of nickel, such as the formates, carbonates, acetates, and oleates decompose upon being heated, yielding under proper conditions finely divided nickel which is eminently suitable for use as a catalyzer.

In many cases hydrogenation is more rapid or complete when a carrier for the catalyst is used. The carrier should be an inert light material in pulverulent form such as pumice stone, silex, infusorial earth or kieselguhr. On account of the characteristic properties of the nickel salts, great difficulty has been experienced hitherto in incorporating them in a sufficiently intimate manner with the carrier material.

By practicing the process of my invention, I am able to secure without difficulty an extremely intimate and stable mixture of a catalyst and carrier, which can be used by adding it directly to the oil to be treated or otherwise as desired. My catalytic material is extremely light and aids in the distribution of the active catalyzer throughout the mass, during the application of hydrogen. At the conclusion of the hydrogenating process the material is readily removed from the oil by filtration.

In accordance with my invention I dissolve freshly precipitated nickel carbonate in formic acid in such proportions that complete reaction occurs. Approximately 1¾ parts of wet purified nickel carbonate containing 60% to 80% of water is dissolved in one part of 85% solution of formic acid, the molecular proportions being such that there is a slight excess of the acid. A solution is thus obtained which remains fixed for a considerable period, but which after a time, rapidly deposits solid nickel formate. This salt is very slightly soluble in water, and is difficult to handle, either to dry, or to incorporate with a vehicle or carrier. Therefore, during the period of perfect solution of the salt and acid spoken of above, I add purified, dry and hot infusorial earth in proportion equivalent to the quantity of formic acid used, that is to say, one part by weight; and then vigorously agitate the mixture. The solution will be completely absorbed by the infusorial earth and intimately commingled therewith, before deposition of the nickel formate begins. The nickel formate is shortly precipitated from the solution, and the mixture then becomes a mass of moist powder containing a potential catalyzer in the form of nickel formate in extremely intimate mixture with the infusorial earth particles.

The moist powder so produced is easily dried by exposure to the air becoming a light green powder. No particular care is required for its preservation, and it can be used by adding it directly to the oil to be hydrogenated, or it may be mixed with oil in small quantities before it is added to the bulk of the oil. After hydrogenation of the oil is complete the infusorial earth carrying the nickel is readily removed by filtering, thus rendering unnecessary the addition of a filtering medium as with most other catalysts.

By potential catalyzer I mean a material capable of use as a catalyst without the necessity of further special or preparatory treatment. Some compounds from which catalyzing material may be made cannot properly be called potential catalyzers. For example nickel nitrate, nickel chloride, and nickel sulphate are not capable of direct use as catalyzers but require further treatment such as heating to decomposition and reduction of the resulting oxide with hydrogen in the case of the nitrate to fit them for this purpose. The nickel salts such as I use, as for example, nickel formate, may be aptly termed potential catalyzers because they may be added directly to the material undergoing treatment, yielding a finely divided nickel catalyst during the course of operation without specific prior intervention.

I claim:

1. In the method of making catalytic material from a solution of a potential catalyzer absorbed in a carrier, the step of precipitating said potential catalyzer without the addition of reagents.

2. In the method of making catalytic material from a solution of a potential catalyzer absorbed in a carrier, the step of precipitating said potential catalyzer without varying the temperature of the solution.

3. The method of making catalytic material which comprises preparing a concentrated nickel formate solution, absorbing the solution in a carrier, and precipitating a potential catalyzer from such absorbed solution.

4. In the method of making catalytic material from a solution of a potential catalyzer absorbed in a carrier, the step of precipitating said potential catalyzer without the addition of reagents and without varying the temperature of the solution.

5. The method of making catalytic material which comprises forming an unstable solution from which a potential catalyzer will shortly precipitate, and prior to said precipitation absorbing the solution in a carrier for said potential catalyzer.

6. The method of making catalytic material which comprises absorbing with a carrier material, an unstable solution from which a nickel salt will subsequently precipitate.

7. The method of making catalytic material which comprises absorbing with a carrier material, a solution from which a nickel formate will shortly precipitate.

8. The method of making catalytic material which comprises forming a solution from which a potential catalyzer will precipitate, and absorbing such solution with infusorial earth.

9. The method of making catalytic material which comprises absorbing with infusorial earth a solution from which nickel formate will subsequently precipitate.

10. The method of making catalytic material which comprises dissolving nickel carbonate in formic acid, and prior to the separation of nickel formate, adding to the solution infusorial earth.

11. The method of making catalytic material which comprises dissolving nickel carbonate in formic acid, and prior to the separation of nickel formate adding to the solution hot, dry, infusorial earth.

12. The method of making catalytic material which comprises dissolving nickel carbonate in formic acid, absorbing the solution into hot, dry, infusorial earth prior to the separation of nickel formate, and after the separation of the nickel formate, drying the product thus formed.

13. The method of making catalytic material which comprises dissolving freshly precipitated nickel carbonate in formic acid, and absorbing the solution into hot, dry, infusorial earth prior to the separation of nickel formate, and after the separation of the nickel formate, drying the resultant product.

14. The method of making catalytic material which comprises dissolving nickel carbonate in formic acid in proportions to secure complete reaction, and absorbing the solution into a carrier material prior to the separation of nickel formate.

15. A catalytic material comprising a pulverulent material impregnated with nickel formate.

16. A catalytic material comprising a carrier of infusorial earth impregnated with nickel formate.

17. A catalytic material comprising the results of the reaction in the presence of an inert carrier, of a mixture of nickel carbonate and formic acid in accordance with the following formula $$NiCO_3 + 2HCOOH = Ni(COOH)_2 + CO_2 + H_2O + \text{excess } HCOOH.$$

In testimony whereof, I have hereunto set my hand.

WILLIAM H. REES.